UNITED STATES PATENT OFFICE.

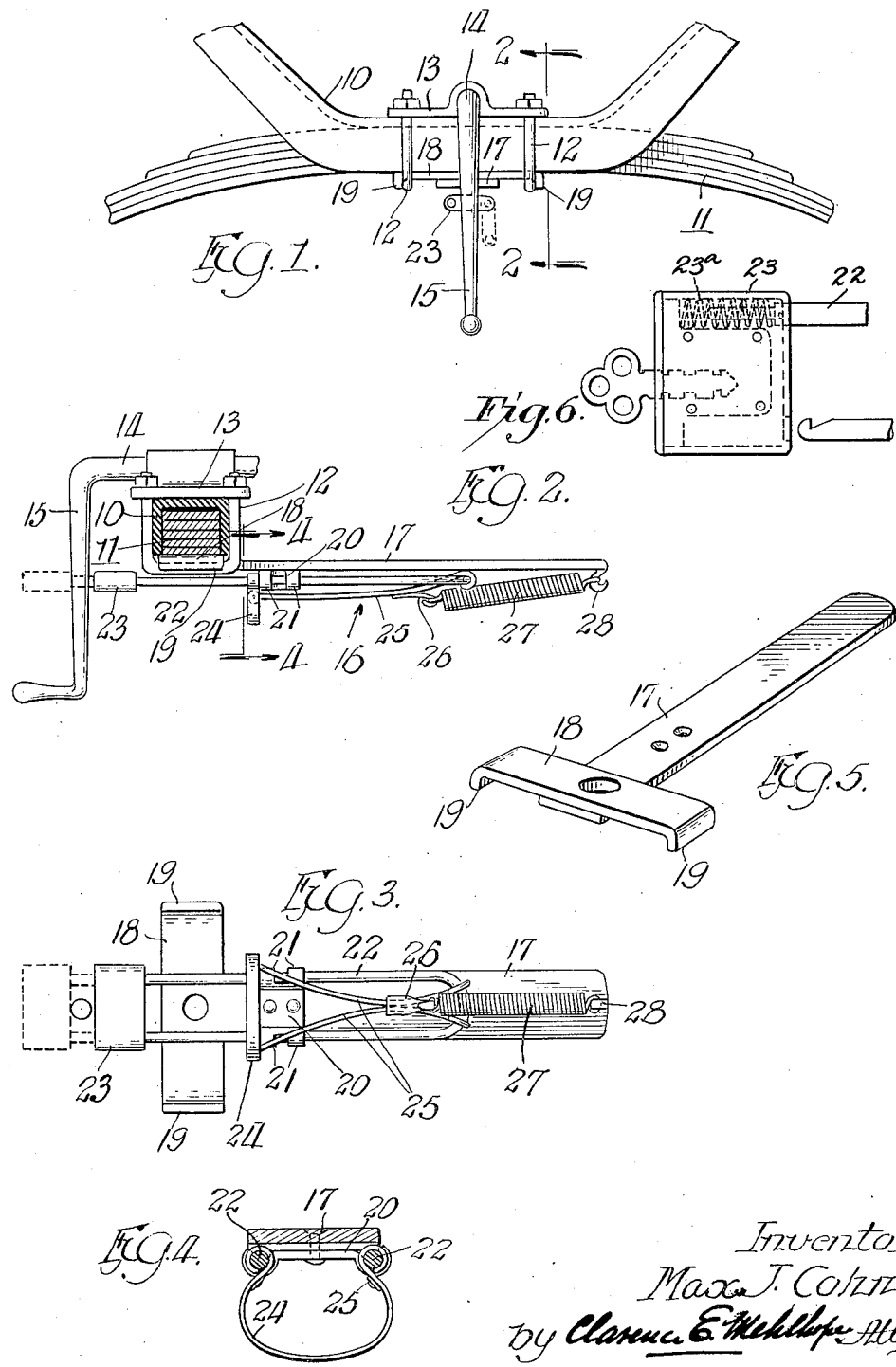

MAX J. COHN, OF CHICAGO, ILLINOIS.

LOCKING DEVICE FOR ENGINE-STARTING CRANKS.

1,351,095.  Specification of Letters Patent.  Patented Aug. 31, 1920.

Application filed September 22, 1919. Serial No. 325,497.

*To all whom it may concern:*

Be it known that I, MAX J. COHN, a citizen of the United States, and a resident of Chicago, in the county of Cook, State of Illinois, have invented new and useful Improvements in Locking Devices for Engine-Starting Cranks; and I do hereby declare that the following is a full, clear, and exact description thereof, reference being had to the accompanying drawings, and to the numerals marked thereon, which form a part of this specification.

This invention relates to improvements in locking devices for engine starting cranks and consists of the matters hereinafter described and more particularly pointed out in the appended claims.

The object of the invention is to provide a simple and efficient device which may be quickly attached to a part of an automobile, for the purpose of locking the engine starting crank in an inoperative position, thus guarding against the starting of the engine by unauthorized persons.

This object of the invention, as well as the several advantages thereof will be made more apparent as I proceed with my specification.

In the drawings:—

Figure 1 illustrates a view in front elevation of the front spring bar and associated spring, together with the engine starting crank of an automobile, to which my improved locking device has been attached.

Fig. 2 illustrates a longitudinal vertical section through parts shown in Fig. 1, the plane of the section being indicated by the line 2—2 of Fig. 1.

Fig. 3 illustrates a bottom plan view of the locking device, embodying my invention.

Fig. 4 illustrates on an enlarged scale, a transverse section through the locking device, the plane of the section being indicated by the line 4—4 of Fig. 2.

Fig. 5 illustrates a perspective view of a T-shaped plate, forming a part of my improved locking device.

Fig. 6 is a view in elevation of a lock embodied in my improved locking device.

Referring now in detail to that embodiment of the invention illustrated in the accompanying drawings, 10 indicates the front spring bar of the frame of an automobile, and 11 indicates the associated front spring, which is connected at its ends in the manner well known to the front axle (not shown). Said spring bar is of a channel shape in cross section, and the leaves of the spring engage between the upright side members thereof, U-shaped bolts or clips 12 clamping the spring to the bar. A plate 13 is fixed to the top surface of the bar 10 by the said U bolts, said plate providing a bearing for the longitudinal part 14 of the engine starting crank 15.

16 indicates as a whole, my improved crank locking device, which is adapted to be attached to the spring bar 10 and spring 11 by the bolts 12, in a manner to be described later. Said device includes a T-shaped base plate, having an elongated body part 17 and a shorter, transversely arranged cross head 18 at one end thereof, the ends of the cross head being bent downwardly to provide flanges or shoulders 19. Said plate may be either stamped out of sheet metal of the desired thickness and strength, or it may be made of two pieces of band iron brazed or otherwise attached together.

On the bottom surface of said body 17, a short distance back of the cross head, is attached in any suitable manner a clip 20, having longitudinal ears 21 at its sides. Said ears provide sleeves in which the spaced side bars of a U shaped yoke 22 have sliding bearing, in a plane parallel with the body 17 of the T plate.

This yoke has associated with it a key operated lock 23, which when unlocked will move endwise of the yoke under the action of a spring 23$^a$ within the lock, on one of the side bars of the yoke until said lock is free of the end of the other side bar, as shown in Fig. 6. Said lock may then be swung about the first mentioned bar of the yoke as an axis into the fully open position as shown in dotted lines in Fig. 1. To again lock the ends of said side bars together, it is only necessary to swing the lock 23 into the plane of the yoke and then impart an endwise inward movement to said lock against the action of the spring 23$^a$, when it will snap into its locked position with respect to said yoke. This yoke and lock, together with the operating key, is of standard make and may be purchased as a unit in the open market.

In front of the clip 20, and fixed to the side bars of the yoke, is a depending handle which normally abuts against said clip. Fixed to said handle are the ends of two brace rods 25, the opposite ends of said rods being secured to that end of the yoke opposite the lock 23. Secured to said rods near their rear ends is a hook 26, to which one end of a contractile coil spring 27 is attached, the other end of said spring being attached to a hook 28 on the free end of the body 17 of the T plate.

To attach the locking device as a whole in an operative position on an automobile, the U bolts 12 are loosened so that their bottom ends will be spaced from the bottom surface of the spring 11, a distance sufficient to permit of the insertion of the head 18 of the T plate between said spring and the bottom ends of said U bolts, the body part 17 being directed toward the rear end of the automobile. The U bolts 12 are again tightened up until the head 18 is tightly clamped against the spring, the engagement of said bolts with the shoulders 19 of said head preventing any lateral or twisting movement of said T plate. With the said plate thus attached, the spring 27 will hold the yoke 22 in its rearmost position wherein the handle 24 engages the clip 20 and with the lock arranged in a position between the crank 15 and spring 11, as shown in full lines in Fig. 2.

Assume now that it is desired to lock the crank 15 against rotation and the crank is in the position shown in Fig. 1. The operator unlocks the lock 23 and swings it about one of the bars of the yoke 22 into the dotted line position shown in Fig. 1. The operator then grasps the handle 24 with one hand and pulls the same forwardly with the side bars of the yoke engaging on opposite sides of the crank, until the lock will clear the crank 15, after which the operator may use his other hand to again connect the lock to the other bar of the yoke. The handle 24 is next released when the spring 27 will draw the yoke 22 rearwardly until the lock engages the crank 15 as shown in dotted lines in Figs. 2 and 3. It is thus apparent that the crank is now locked against movement. To unlock the crank, the key is used to unlock the lock which is now turned into the position shown in Fig. 1, when the spring 27 will draw the yoke rearwardly so that the lock 23 in no manner interferes in the turning of the crank.

My improved device comprises but a few parts, which are so constructed and arranged that they cannot rattle nor are they so observable as to be objectionable when the automobile is under way. The device may be applied with but the aid of a wrench and it may be quickly and easily operated to lock or unlock the starting crank, whichever the case may be.

While in describing my invention I have referred to certain details of mechanical construction and arrangement of parts, I do not wish to be limited thereto except as may be pointed out in the appended claims.

I claim as my invention:

1. A device of the kind described comprising, a plate adapted to be attached to a fixed part of an automobile in the vicinity of the engine starting crank, a yoke longitudinally slidable on said plate, said yoke having laterally spaced side bars, which in one position of the yoke will engage on opposite sides of said starting crank, and a lock for connecting the ends of said side bars together when said crank is arranged between said side bars.

2. A device of the kind described comprising, a plate adapted to be attached to a fixed part of an automobile in the vicinity of the engine starting crank thereof, a U shaped locking yoke longitudinally movable on said plate, said yoke including laterally spaced side bars, which in one position of the yoke will engage on opposite sides of said starting crank, a lock carried by one of said side bars and adapted to lockingly engage the other side bar, and a spring for normally holding said yoke in a position wherein the associated lock is removed from the path of the engine starting crank.

3. A device of the kind described comprising, a plate adapted to be attached to a fixed part of an automobile in the vicinity of the engine starting crank thereof, a U shaped locking yoke longitudinally movable on said plate, said yoke including laterally spaced side bars, which in one position of the yoke will engage on opposite sides of said starting crank, a lock carried by one of said side bars and adapted to lockingly engage the other side bar, a spring for normally holding said yoke in a position wherein the associated lock is removed from the path of the starting crank, and a handle associated with said yoke to move the same against the action of said spring into a position wherein the side bars will engage on opposite sides of said engine starting crank.

4. A device of the kind described comprising, a plate adapted to be attached to the front spring and bar of an automobile, in the vicinity of the engine starting crank thereof, means providing spaced bearing sleeves on said plate, a U shaped yoke including laterally spaced side bars which have longitudinal sliding bearing in said sleeves and which in one position of said yoke will engage on opposite sides of said starting crank, a lock carried by one of said side bars and adapted to lockingly engage the other side bar, a spring interposed between said yoke and a fixed part of said plate, and a handle associated with said yoke for moving the same against the action of said spring, said handle normally engaging with the bearing sleeve and limiting the rearward movement of said yoke.

5. A locking device for engine starting cranks of automobiles comprising, an elongated U shaped yoke having side bars and a lock pivoted on one end of one of said side bars and adapted to be lockingly connected to the associated end of the other side bar, and a plate on which said yoke has sliding bearing, said plate being adapted to be attached to a part of the automobile frame in the vicinity of said starting crank.

6. A locking device for the engine starting crank of an automobile comprising, a T shaped plate including a long body and a shorter cross head, the ends of which are bent to define flanges, a bearing clip on said long body, a U shaped locking yoke slidable in said clip longitudinally of said body, and a lock associated with the spaced ends of said yoke, to lockingly connect them together.

In testimony that I claim the foregoing as my invention, I affix my signature in the presence of two witnesses, this 20th day of Sept., A. D. 1919.

MAX J. COHN.

Witnesses:
F. A. WIEGMAN,
T. H. ALFREDS.